PUSH BUTTON MECHANISM FOR TAPE RECORDER AND PLAY BACK DEVICE

Original Filed April 24, 1952 3 Sheets-Sheet 1

INVENTOR.
WALTER C. HIRONIMUS

BY

Ostrolenk and Faber
ATTORNEYS

Nov. 11, 1958 W. C. HIRONIMUS 2,859,636

PUSH BUTTON MECHANISM FOR TAPE RECORDER AND PLAY BACK DEVICE

Original Filed April 24, 1952 3 Sheets-Sheet 2

INVENTOR.
WALTER C. HIRONIMUS

BY

Ostrolenk and Faber

ATTORNEYS

Nov. 11, 1958 W. C. HIRONIMUS 2,859,636

PUSH BUTTON MECHANISM FOR TAPE RECORDER AND PLAY BACK DEVICE

Original Filed April 24, 1952 3 Sheets-Sheet 3

INVENTOR.
WALTER C. HIRONIMUS

BY

Ostrolenk and Faber

ATTORNEYS 2,859,636

PUSH BUTTON MECHANISM FOR TAPE RECORDER AND PLAY BACK DEVICE

Walter C. Hironimus, Charlotte, Mich., assignor to Wilcox Gay Corporation, Charlotte, Mich., a corporation of Michigan Original application April 24, 1952, Serial No. 284,073, now Patent No. 2,793,039, dated May 21, 1957. Divided and this application January 13, 1954, Serial No. 403,713

1 Claim. (Cl. 74—483)

My present application is a division of my application Serial No. 284,073 filed April 24, 1952, which has matured into U. S. Patent 2,793,039, and relates to a tape recorder and play back device and more particularly it relates to a push button mechanism for operating a tape recorder and play back device.

Up to the present time tape recorder and play back devices, hereinafter referred to as tape recorders, were provided with a single switch having generally three positions, a central position for stop, a side position for reverse and another side position for forward.

If, for example, it was desired to record information on the tape of such a tape recorder, the tape was first placed so that it would pass through the magnetic recording device and then the switch moved to the forward position. A system of clutches connected with the switch would make the tape reels move slowing during this recording operation.

If, on the other hand, it was desired to play back the information recorded, it was first necessary to move the switch in the position reverse, at which position the reel would be slowly moved in the reverse position.

After this operation, the switch was moved to the forward position passing through the intermediate or stop position. When on the other hand it was desired to move the tape quickly in either the reverse or the forward position, a readjustment of the tape in the tape recorder mechanisms was necessary, involving therefore a considerable amount of adjustments.

Furthermore, in the prior art in order to record information on previously used tapes it was first necessary to pass the tape through an erasing mechanism and then use the tape for the recording operation.

My present invention overcomes the above-mentioned difficulties providing push button controls for fast reverse, fast forward motion of the tape for record play back and stop. It further provides an arrangement of the erasing head so that the operation of erasing previous information from a tape is made as the tape moves for the recording operation.

My push buttons are provided with mechanical apparatus so that when the reverse and forward push buttons are pressed down, neither the recording operation nor the play back operation can take place.

Furthermore, when either the reverse or the forward push buttons are pressed down, either the stop or the inoperative key can release the key that is pressed down, the recording and the play back key being locked in their inoperative position until the stop button is depressed.

When the record or play back key is pressed down, the stop key, the fast forward key and the fast reverse key can all release the record or the play back key. On the other hand, when the fast forward or fast reverse keys are in the operative position, only the inoperative key or the stop key may release them. This is necessary to prevent tape spillage which would occur if the tape movement were suddenly slowed by the introduction of the tape speed controlling mechanism.

Essentially my novel tape recorder consists of a series of push buttons having common mechanisms so that any key can release any other key if this other key is not locked. The push buttons engage extensions of various members. The fast reverse and fast forward keys can move a member which serves to lock the record and play back keys. The stop key or push button can release the reverse and forward keys and moves a braking member to stop the rotation of the tape reels. The record push button makes the erasing head and the recording head operative when pressed, also providing a good contact engagement between the tape and recording head. The record push button also operates a rotatable member of my novel tape recorder so that an idler carrying the tape may bear with a certain amount of pressure against a constant speed capstan to control the speed of motion of the tape when the record push button is pressed down.

A similar operation occurs when the play back push button is pressed down, the only difference being that the erasing head is not operative when the above-mentioned push button is operative.

The main object of my present invention is the provision of means whereby a tape recorder may be operated by push button mechanisms.

Another object of my present invention is the provision of means whereby preselected push buttons are locked inoperative when some other bush buttons are in the operative position.

A further object of my present invention is the provision of means whereby any push button may release any other push button unless this other push button is locked inoperative.

The foregoing and many other objects of my invention will become apparent in the following description and drawings in which.

Figure 1:
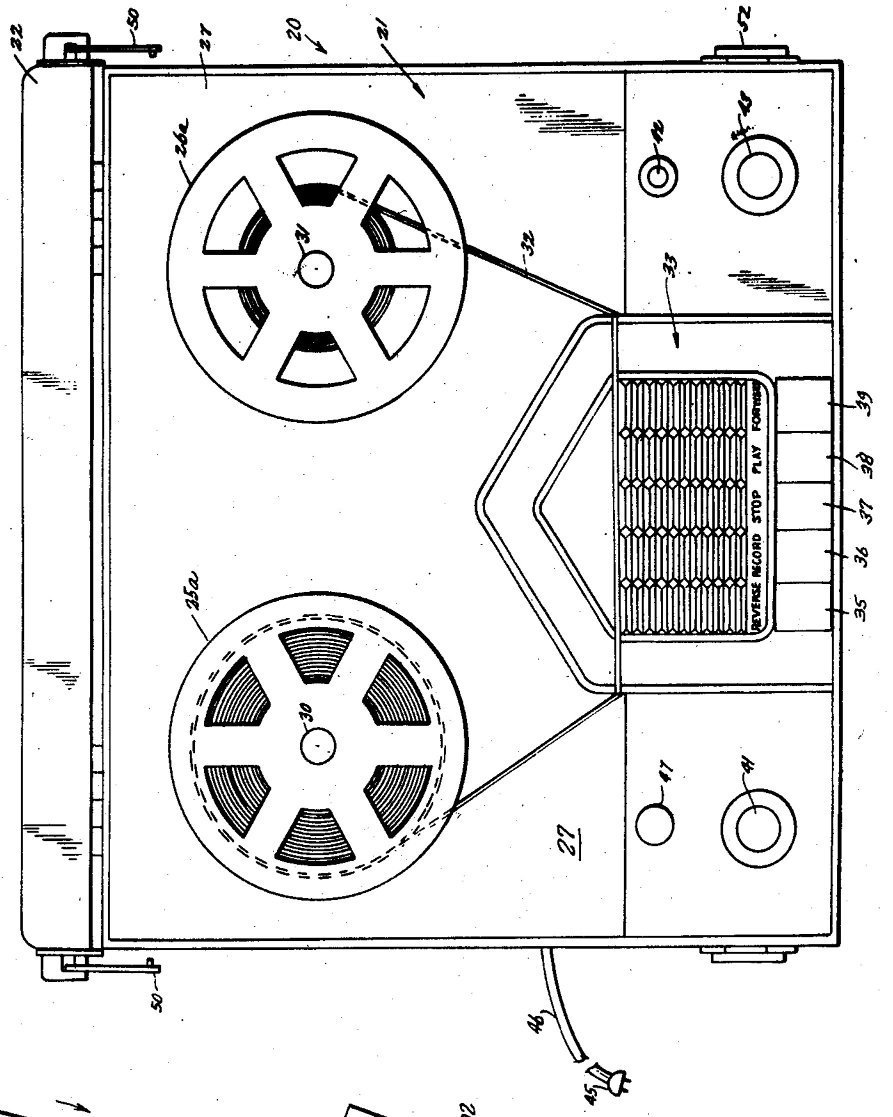
Figure 1 is a top view of my novel tape recorder.

Referring first to Figure 1 showing the tape recording and play back device, hereinafter referred to as the tape recorder, of my invention, all the mechanical and electric elements of the tape recorder 20 are mounted in a cabinet or housing 21 provided with a cover 22 for completely enclosing in cooperation with housing 21 the above-mentioned mechanical and electrical elements of tape recorder 20.

Tape reels **25*a* and 26*a* are located above the upper surface 27 of housing 21. Tape reels 25*a* and 26*a* are actually mounted on shafts 30 and 31, respectively, with which they can move in rotational motion. The tape itself 32 is here shown partly rolled on reel 25*a* and part on roll 26*a* and passing through the interior of raised position 33. Under surface 27 in correspondence with reels 25*a* and 26*a* are drums 25 and 26 movable with reels 25*a* and 26*a***.

Above upper surface 27 of housing 21, there are also located the electrical and mechanical controls, hereinafter described, of tape recorder 20.

More precisely, a series of push buttons consisting of a "reverse" push button 35, a "record" push button 36, a "stop" push button 37, a "play" push button 38 and a "forward" push button 39 is located on surface 27 of housing 21.

Furthermore, a sound volume knob 43, a recording indicator lamp 42 and tone knob 41 are located on the same surface 27 of housing 21. A plug 45 for connecting the tape recorder 20 to an electric power line is connected to an electric conductor 46 which passes through the back portion of housing 21 of tape recorder 20. Surface 27 of housing 21 is also provided with an input jack opening 47 to permit the connection of a microphone into the tape recorder for recording operations.

Cover 22 is also provided with appropriate means 50 for releasably securing cover 22 to housing 21 when it is desired to completely close tape recorder 20. Locking means 50 of cover 22 engage their corresponding stationary members 52 on housing 21 at this closed position in a manner well-known in the art.

Figure 2:
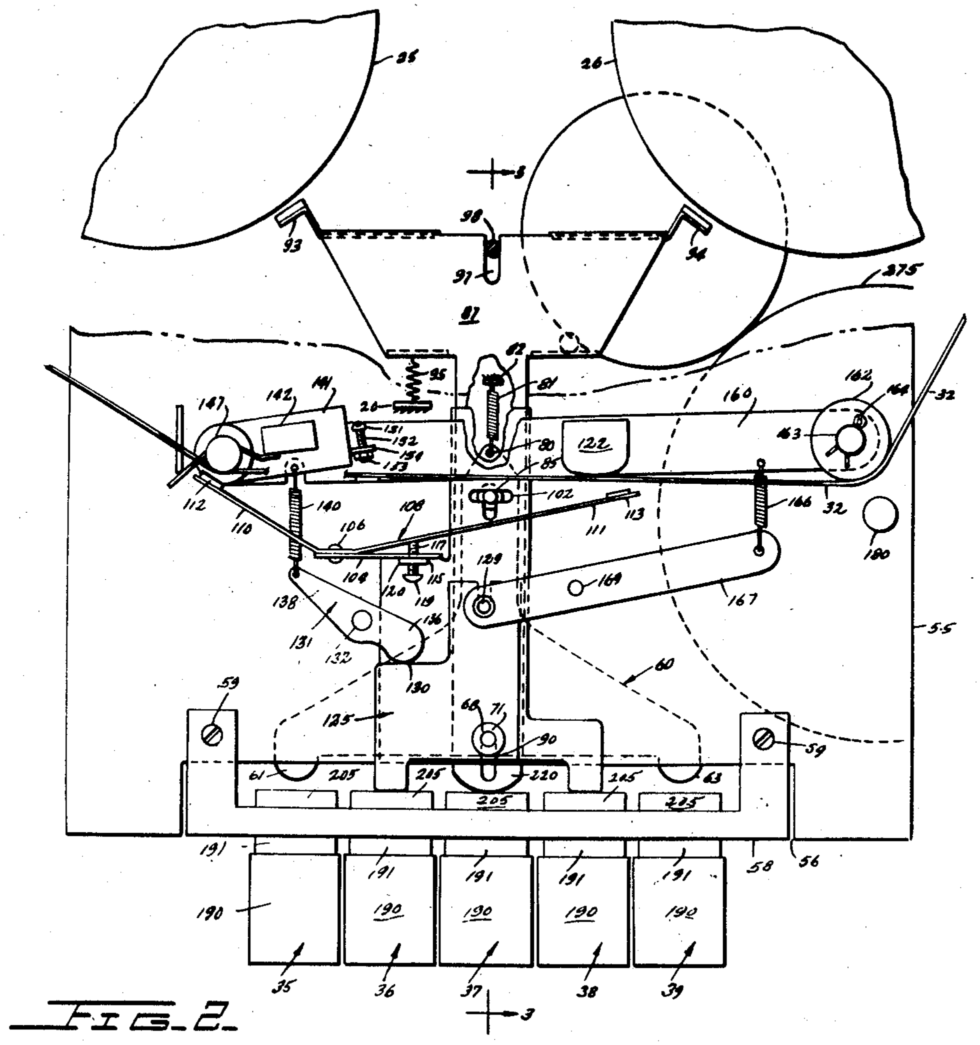
Figure 2 is a schematic view of the push buttons and their associated mechanisms with the tape recorder in its neutral or inoperative position.
Figure 3:
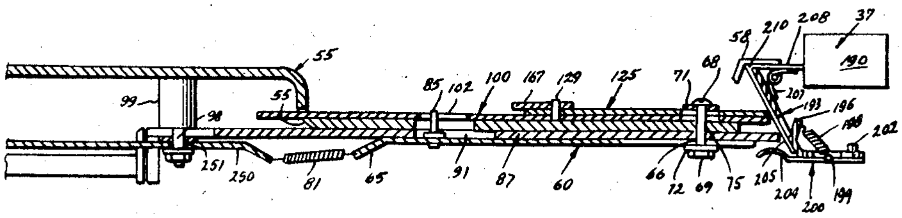
Figure 3 is a cross-sectional view of the tape recorder of Figure 2 taken on line 3—3 looking in the direction of the arrows.
Figure 6:
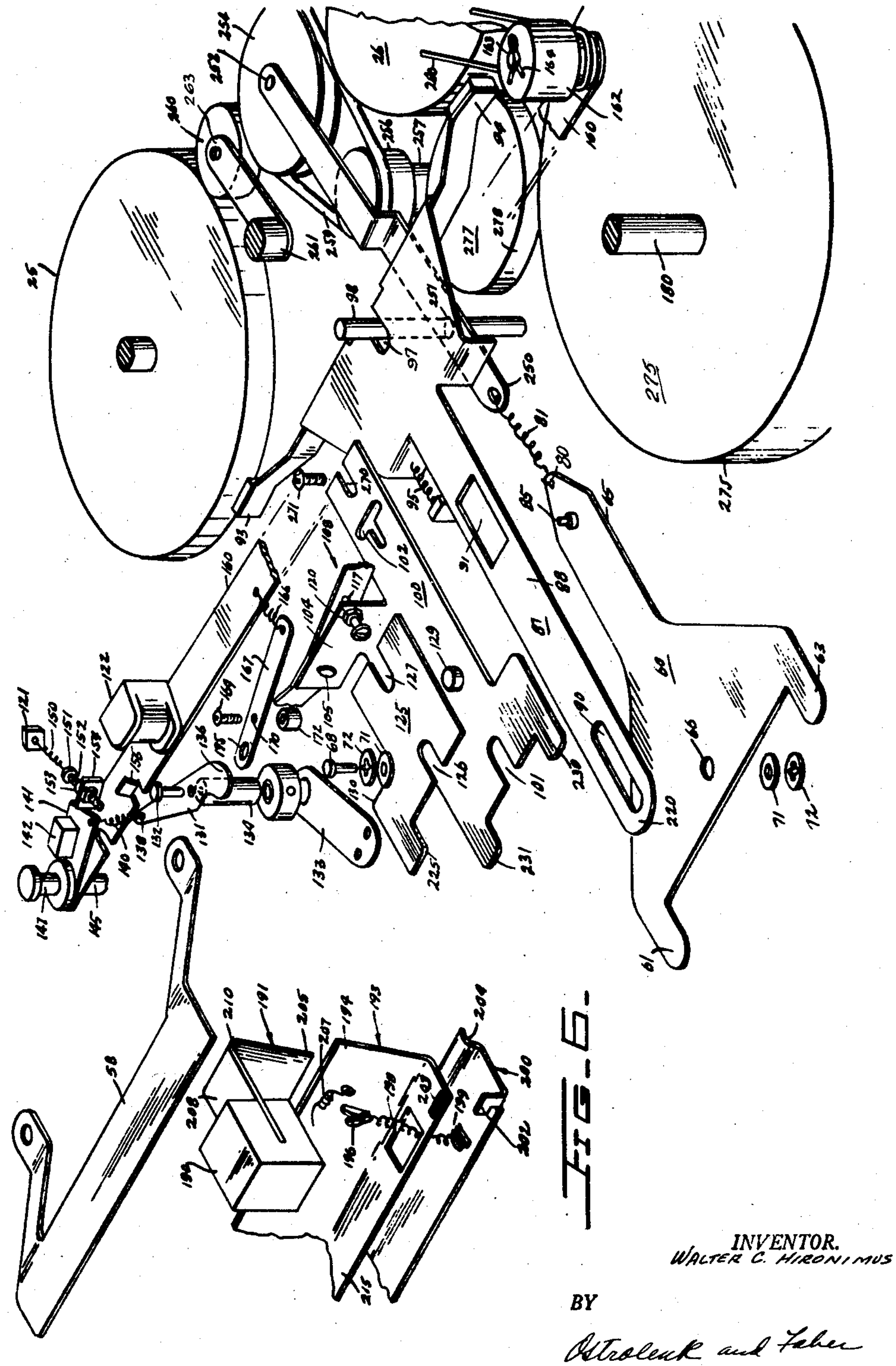
Figure 6 is an exploded view of my novel tape recorder.

Referring now to Figures 2, 3 and 6 showing, respectively, a plan view, a sectional view and an exploded view of my tape recorder in its "idle" position, that is, in a position in which all push buttons 35, 36, 37, 38, 39 are in the inoperative or raised position, the previously mentioned raised portion 33 is actually a one-piece plastic casting separate from base plate 21 mounted in any suitable way on the upper surface 27 of housing 21. Base plate 21 has a recess 56 in which push buttons 35 to 39, inclusive, are mounted. A C-shaped member 58 is secured by means of bolt and nut means 59 to cover 55 to bridge recess 56 and to perform a function hereinafter described.

A Y-shaped member 60 having two small parallel extensions 61 and 63 and a large centrally located extension 65 is provided with an opening 66 engaged by a boss 68 having washers 71 and retaining washers 72. Boss 68 also engages through an appropriate opening 75 cover 55 so that Y-shaped member 60 can rotate around boss 68 but cannot move in translational motion with respect to cover 55.

Extension 65 of Y-shaped member 60 is provided at its tip with an opening 80 engaged by one end of a spring 81, the other end of spring 81 being engaged to a member 250 pivoted at opening 251 engaged by pin 98. Member 250 is provided at its other end with a pin 252 which serves as the shaft for pulley 254 rotatable by larger diameter portion 256 of shaft 257 of the motor (not shown) of the tape recorder through belt 259.

When Y-shaped member 60 is moved counterclockwise as described hereinafter, pulley holding member 250 will rotate around its pivot 98, thus causing idler pulley 254 to come into contact with the rim of the drum 26 through rubber belt 259.

Assuming that the motor (not shown) rotates in the clockwise direction, then portion 256 of shaft 257 of the motor will also rotate in a clockwise direction and so will pulley 254 causing, therefore, drum 26 to rotate in the counterclockwise direction.

Because of the particular type of coupling and the dimensions of shaft portion 256, pulley 254 and drum 26, it is seen that when the motor rotates at a certain preselected speed, drum 26 will also rotate in the opposite direction at a slower but very close speed with respect to the speed of the motor.

When Y-shaped member 60 is moved from its center position, in the clockwise direction, idler carrying member 250 will rotate around pin 98 to move pulley 254 in the direction of the other drum 25. Pulley 254 will then come into engagement with a second idler 260 rotatable around pin 261 and connected to pin 261 through arm 263.

When, therefore, Y-shaped member 60 is moved in the clockwise direction, pulley 254 will bear against second idler 260 and second idler 260 will in its turn bear against the rim of drum 25. If the motor (not shown) rotates still clockwise as previously mentioned, pulley 254 will also rotate clockwise but now because of the interposition of second idler 260, drum 25 will rotate also in the clockwise direction.

In this case, drum 25 will rotate at a relatively high speed in the clockwise direction causing the tape 32 wound on reel 25a and reel 26a to move from reel 26a and to reel 25a which in the present embodiment corresponds to reverse motion of reel 32.

Pin 261 of second idler 260 is rigidly secured to housing 21 of tape recorder 20. Y-shaped member 60 is also provided near the opening 80 of extension 65 with a pin 85 whose use will be hereinafter described.

A T-shaped member 87 is mounted above the Y-shaped member 60. T-shaped member 87 is provided at its center leg 88 with two slots 90 and 91 which permit translational motion of T-shaped member 87 in a direction parallel to the direction at which extension 65 of Y-shaped member 60 is biased. In other words, slot 91 is for clearance for pin 85 carried by Y-shaped member 60. T-shaped member 87 performs a braking function and carries, therefore, self-energizing brakes 93 and 94 on each side arm of its T structure. Brakes 93 and 94 serve to stop the motion of tape reels 25a and 26a, respectively, in a manner which will hereinafter be described.

T-shaped member 87 is also biased toward its inoperative position, that is, toward the position at which brakes 93 and 94 are farthest from reel drums 25 and 26 by means of a spring 95 secured on one side to T-shaped member 87 and at the other to the housing 21 of the tape recorder 20. Since only one spring 95 is used to so bias T-shaped member 87, T-shaped member 87 is provided at its top portion with an open slot 97 which engages at all times pin 98 which is actually a part of the base plate 21.

It is seen that when the width of slot 97 is approximately equal to the diameter of pin 98, member 87 although biased in one direction by spring 95 will not be able to rotate but will be able to move in a translational motion with respect to pin 98. Of course, the slot 90 is also engaged by pin 68 while pin 85 can move in slot 91 without interfering with the motion of T-shaped member 87.

Above T-shaped member 87 is mounted the "play" operating member 100 which is provided at one end with an open slot 101 and at the center with a T-shaped slot 102 and at the other end with open slot 270. Slot 101 is engaged by pin 68 while slot 102 is engaged by pin 85 carried by Y-shaped member 60 in apparatus hereinafter described, and slot 270 is engaged by pin 271.

Member 100 has a raised portion 104 provided with one opening 105 aligned with another opening 106 of pad holding member 108. A rivet passing through openings 105 and 106 on members 100 and 108, respectively, rigidly secures member 108 to raised portion 104 of member 100. Pad holding member 108 is V-shaped and carries at its outer ends 110 and 111 two pads, one on each side, 112, 113, respectively.

Extension 104 of member 100 is provided with a second opening 115 engaged by extension 117 of the bolt 119 having a nut 120. Extension 117 serves to decrease the angle between arm 110 and arm 111 of V-shaped pad holding member 108. In other words, bolt 119 performs the function of increasing or decreasing the pressure which pad 113 exerts on the tape 32 as it passes the magnetic head 122 so that no transverse play of tape 32 is allowed and optimum conditions for play back or recording are obtained. Member 100 is also provided with extensions 230 and 231.

Further above member 100 is "record" member 125. It is here necessary to mention the fact that while members 100 and 125 are above surface 21, members 60 and 87 are below surface 21 and that, therefore, surface 21 must be provided with appropriate openings through which, for example, pin 85 and boss 68 may pass from one side of the other of surface 21.

"Record" member 125 is also provided with an open slot 126 at one end and another open slot 127 at the other end. Slot 126 is engaged by boss 68 while slot 127 is engaged by a pin 129 rigidly mounted on play member 100. Member 125 is shaped to have a shoulder 130 which engages a centrally pivoted member 131 rotatably secured to housing 21 of tape recorder 20 by means of a shaft 132 passing through housing 21 and carrying on its other end a lever 133 for switching the amplifier (not shown) of the tape recorder 20 in a well-known way.

More specificaly, shoulder 130 engages at all times extension 136 of member 131. On the other side 138 of member 131 is connected a spring 140 which carries at its other end a support 141 for the erasing head 142. Support 141 is rotatably mounted on a shaft 145 which carries also tape guide 147.

The function of spring 140 is to bias extension 136 of member 131 against shoulder 130 of record member 125 and also as a means for moving in rotational motion erasing head 142 when member 131 is rotated in a counterclockwise direction by translational movement of shoulder 130 of record member 125.

Erasing head 142 is biased in its inoperative position by means of a spring 150 secured on one side to housing 21 of tape recorder 20 and on the other to the head 151 of a bolt 152 which engages a nut 153 and a raised extension 154 of support 141.

When the tape recorder 20 is in the position shown in Figure 2, that is inoperative, the tension produced by spring 150 is greater than that produced by spring 140 so that the erasing head 142 together with its support 141 form an angle with respect to the magnetic means supporting member 160.

When, on the other hand, member 131 is rotated counterclockwise by depressing button 36 the tension of spring 140 is made greater than that of spring 150 so that support 141 together with erasing head 142 are rotated clockwise with respect to the position described above to be essentially parallel to the magnetic means supporting member 160 and with the erasing head 142 contacting the tape 20.

To stop the above-described clockwise rotation of supporting member 141 under action of spring 140, a stop member 155 is raised from supporting member 160 in alignment with bolt 152 so that at the end of a preselected amount of rotation the extending portion of bolt 152 will hit raised stop member 155, thus stopping the rotation of erasing head supporting member 141.

Magnetic means supporting member 160 is also rotatably mounted in any suitable way on shaft 145. On this suppporting member 160 is mounted recording head 122 and supporting member 160 is also provided at the end opposite the one in which it is pivoted with an idler roller 162 rotatably mounted on a shaft 163 rigidly secured to supporting member 160. A cotter pin 164 serves to keep roller 162 from moving in an axial motion with respect to shaft 163.

Supporting member 160 is also provided near roller 162 with a spring 166 which engages at its other end an arm 167 rotatably secured to housing 21 of tape recorder 20 by means of a bolt 169 engaging an opening 170 of arm 167, the housing 21 of tape recorder 20 and an end 172. Arm 167 is provided at the end opposite the one at which spring 166 is secured with a circularly shaped opening 175 which engages pin 129 of play member 120 at that portion of pin 129 which extends beyond and above record member 125.

Mounted also on housing 21 of tape recorder 20 is a fly wheel 275 having a capstan 180 which extends through surface 55 of tape recorder 20 close to idler roller 162. Fly wheel 275 is rotated by shaft 257 of the motor of the tape recorder through an idler roller 277 whole rim 278 is in engagement with both fly wheel 275 and shaft 257.

Because of interposition of idler roller 277, a clockwise rotation of motor 257 causes a similar clockwise rotation of fly wheel 257 and, therefore, of capstan 180 of fly wheel 275. Capstan 180 of fly wheel 275 when engaged by roller 162 that tape 32 being interposed between roller 162 and capstan 180, will determine with its speed and the speed of roller 162 the forward movement of tape 32 during the record or play back operation.

All the above-described members 60, 87, 100, 125 are operated, as fully described in U. S. Patent 2,793,039, by means of push buttons 35, 36, 37, 38, 39. These push buttons, of which one is shown in an exploded view in Figure 6, consist of a block 190 carrying a V-shaped member 191. Mounted centrally with respect to the V-shaped member 191 is another angularly shaped member 193 having a raised portion 194 which engages the apex of member 191 so that member 191 can rotate with respect to member 193. Member 193 is secured in any suitable way to the housing 21 of tape recorder 20. Member 193 is provided with a raised finger 196 engaging one end of spring 198. The other side of spring 198 engages another raised finger 199 of a movable member 200.

Member 200 is provided with a raised extension 202 which engages an opening 203 in angularly shaped member 193 to permit only the rotation of member 200 with respect to member 193 but not translation. Member 200 is so shaped at the end opposite the one at which it is hinged on member 193 so as to have a circularly shaped extension 204 which can be engaged by extension 205 of the V-shaped member 191. A coil spring 207 placed between section 208 of V-shaped member 191 and raised portion 194 of member 193 serves to bias section 298 away from raised extension 194 of member 193.

It is quite evident that there will be one block 190, one V-shaped member 191 for each of the above-described push buttons 35, 36, 37, 38, 39. Members 193 and 200, on the other hand, are common to all the push buttons. It is also necessary to mention the fact that in its inoperative position section 208 of V-shaped member 191 bears under action of spring 297 against bridge member 58 and, therefore, serves to hold the movable parts of push buttons 35, 36, 37, 38, 39 in a certain preselected position when inoperative. This same bridge member 58 also serves to permit rotation of member 191 around its apex 210 without permitting any translational movement of member 191 and, therefore, of block 190 of push button 35 or 36 or 37 or 38 or 39.

Figure 4:
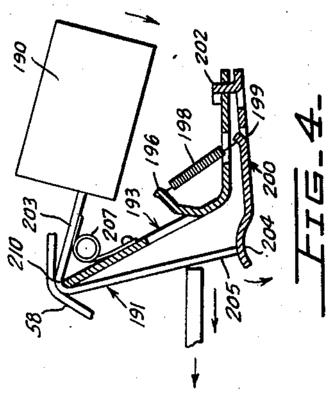
Figure 4 is a detail view of my novel push button release and latch mechanism when the push button is in the intermediate position.
Figure 5:
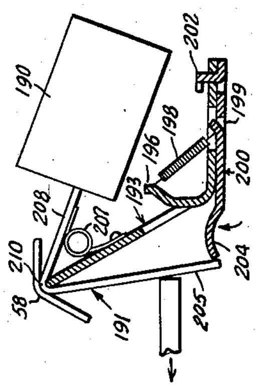
Figure 5 is a detail view of my novel push button release and latch mechanism when the push button is in latched condition.

More particularly, referring to Figures 4 and 5, when push button 35 is pressed down, the relative positions of members 191, 200 and 193 are thus shown in Figure 5. If now push button 39 is pressed down not only will it perform the above-described operations, but it will cause V-shaped member 191 to rotate around its apex 210 in a clockwise direction as shown in Figure 5 against the bias of the coil spring 207.

Rotation of V-shaped member 191 is made possible as previously mentioned by applying a pressure on block 190 and V-shaped member 191 can rotate around its apex 210 since the apex engages the bent portion of bridge member 58 at one side and the raised portion 194 of angular member 193 at the other side as shown in the figures.

Rotation of V-shaped member 191 causes its extension 205 to move from the position shown in Figure 3 to the position shown in Figure 4 where portion 205 of member 191 bears against the curve shaped portion 204 of member 200, causing member 200 to rotate with respect to the base 215 of member 193 against the bias of spring 198.

As previously mentioned, members 193 and 200 are common to all the push buttons 35–39 so that when member 200 is rotated in a counterclockwise direction by motion of extension 205 of member 191 produced by the operation of push button 39, V-shaped member

191 of push button 39 will be released from its latch engagement with its corresponding portion of curve shaped section 204 of member 200, thus causing push button 35 to return to its original position since now spring 207 of push button 35 is free to rotate and, therefore, to rotate V-shaped member 191 of push button 35 and with it block 190 of push button 35 to its original inoperative position as shown in Figure 3.

Of course, the push button shown in Figure 3 is actually the stop push button 37 and not 35 or 39 but since all the push buttons are similarly constructed, the inoperative position of push buttons 35 and 39 will be the same as that of push button 37.

Now as push button 39 is pressed further down from the position of Figure 4, all the operating parts will be placed as shown in Figure 5. In other words, extension 205 of V-shaped member 191 will now be latched in push button 39 operative position by engagement of extension 205 with the end of bent portion 204 of member 200 as shown in Figure 5 where, of course, member 200 has returned to its original position under action of spring 198.

From the above description it is seen that the operation of any of the five push buttons will cause the other four to be released from their positions and, therefore, will cause them to return to their inoperative position. In other words, by this arrangement only one push button can be in its operative position at any one time.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

In a tape recording and play back device for recording and playing back a tape, for fast forward motion and for fast reverse motion of said tape, for stopping said tape, operating means comprising push buttons, latching means secured to said push buttons, said latching means comprising a V-shaped member rigidly secured on one of its legs to each of said push buttons and rotatable around the apex of said V-shaped member, a biasing surface having a protruding portion at one end, said biasing surface being rotatable around its other end, the other leg of said V-shaped member bearing against said biasing surface and rotating said biasing surface at activation of its corresponding push button to release all other V-shaped members and their corresponding push buttons and to be latched at the end of its travel by the end of said protruding portion of said biasing surface.

References Cited in the file of this patent

UNITED STATES PATENTS

| | | |
|---|---|---|
| 826,198 | Snyder | July 17, 1906 |
| 1,905,522 | Stephanson | Apr. 25, 1933 |
| 2,277,934 | Osborne et al. | Mar. 31, 1942 |
| 2,451,150 | Brian | Oct. 12, 1948 |
| 2,626,335 | Landin | Jan. 20, 1953 |